United States Patent

Widdig et al.

[11] 3,835,164
[45] Sept. 10, 1974

[54] N-ALKOXYCARBONYL-N'-ACYL-N''12-ACYLAMIDOPHENYL-GUANIDINES

[75] Inventors: Arno Widdig, Blecher; Engelbert Kühle, Bergisch-Glad-Bach; Helmut Kaspers, Leverkusen; Ferdinand Grewe, Burscheid, all of Germany

[73] Assignee: Bayer Aktiengesellschaft, Leverkusen, Germany

[22] Filed: Nov. 2, 1972

[21] Appl. No.: 303,301

[30] Foreign Application Priority Data
Nov. 19, 1971  Germany............................ 2157368

[52] U.S. Cl.......... 260/347.4, 260/471 C, 424/285, 424/326
[51] Int. Cl............................................. C07d 5/26
[58] Field of Search...................... 260/347.4, 471 C

*Primary Examiner*—Henry R. Jiles
*Assistant Examiner*—Mildred M. Crowder
*Attorney, Agent, or Firm*—Burgess, Dinklage & Sprung

[57] ABSTRACT

N-alkoxycarbonyl-N'-acyl-N''-2-acylamidophenyl-guanidines of the formula

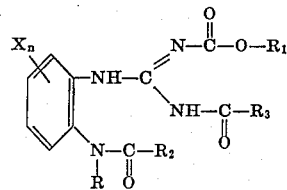

(I)

in which
X is halogen, lower alkyl or lower alkoxy,
n is 0, 1 or 2,
R is hydrogen or lower alkyl,
$R_1$ is alkyl of 1–6 carbon atoms,
$R_2$ is hydrogen, alkyl with 1–18 carbon atoms optionally substituted by halogen, cyano, lower alkoxy, lower alkoxycarbonyl, phenoxy, halophenoxy, alkylphenoxy or alkoxyphenoxy; cycloalkyl of 5–8 carbon atoms; aralkyl optionally substituted by halogen, lower alkyl or lower alkoxy; aryl optionally substituted by halogen, lower alkyl or lower alkoxy; or furyl; and
$R_3$ is hydrogen, alkyl with 1–18 carbon atoms optionally substituted by halogen, cyano, lower alkoxy, lower alkoxycarbonyl, phenoxy, halophenoxy, alkylphenoxy or alkoxyphenoxy; alkenyl or alkynyl of 2–12 carbon atoms; cycloalkyl of 5–8 carbon atoms; aralkyl optionally substituted by halogen, lower alkyl or lower alkoxy; aryl optionally substituted by halogen, lower alkyl or lower alkoxy; or furyl, which possess fungicidal properties.

7 Claims, No Drawings

N-ALKOXYCARBONYL-N'-ACYL-N''12-ACYLAMIDOPHENYL-GUANIDINES

The present invention relates to and has for its objects the provision of particular new N-alkoxycarbonyl-N'-acyl-N''-2-acylamidophenyl-guanidines, optionally substituted on the acyl radical, the acylamido radical and/or the phenyl ring, which possess fungicidal properties, active compositions in the form of mixtures of such compounds with solid and liquid dispersible carrier vehicles, and methods for producing such compounds and for using such compounds in a new way especially for combating fungi, with other and further objects becoming apparent from a study of the within specification and accompanying examples.

It is known from Belgian Patent Specification 568,612 that certain guanidine derivatives can be used as fungicides, for example dodecylguanidine acetate (Compound A). This compound has attained a considerable practical importance. The salts of dodecylguanidine can be used in place of the phenylmercury salts (which are toxic to animals) for controlling scab (Venturia inaequalis and Venturia pirina) in pip fruit cultivation. However, the salts of dodecylguanidine are only very slightly effective against powdery mildew fungi from the family of the *Erysiphaceae*, such as the causative organism of powdery mildew of apples, *Podosphaera leucotricha*.

The present invention provides amidophenylguanidines of the general formula

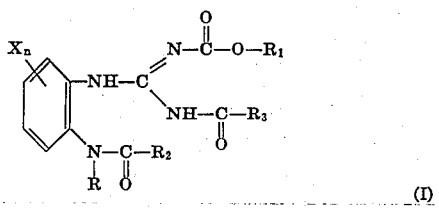

(I)

in which
X is halogen, lower alkyl or lower alkoxy,
n is 0, 1 or 2,
R is hydrogen or lower alkyl,
$R_1$ is alkyl of 1–6 carbon atoms,
$R_2$ is hydrogen, alkyl with 1–18 carbon atoms optionally substituted by halogen, cyano, lower alkoxy, lower alkoxycarbonyl, phenoxy, halophenoxy, alkylphenoxy or alkoxyphenoxy; cycloalkyl of 5–8 carbon atoms; aralkyl optionally substituted by halogen, lower alkyl or lower alkoxy; aryl optionally substituted by halogen, lower alkyl or lower alkoxy; or furyl; and
$R_3$ is hydrogen, alkyl with 1–8 carbon atoms optionally substituted by halogen, cyano, lower alkoxy, lower alkoxycarbonyl, phenoxy, halophenoxy, alkylphenoxy or alkoxyphenoxy; alkenyl or alkynyl of 2–12 carbon atoms; cycloalkyl of 5–8 carbon atoms, aralkyl optionally substituted by halogen, lower alkyl or lower alkoxy; aryl optionally substituted by halogen, lower alkyl or lower alkoxy; or furyl.

Preferably X is chlorine, bromine, fluorine, methyl, ethyl, isopropyl, methoxy, ethoxy or isopropoxy, n is 0 or 1, R is hydrogen, methyl or ethyl, $R_1$ is methyl, ethyl, propyl or butyl, $R_2$ is methyl, ethyl, propyl, undecyl, heptadecyl, cyclohexyl, phenyl, phenoxymethyl or 2-furyl, and $R_3$ is methyl, ethyl, propyl, undecyl, heptadecyl, ethoxymethyl, propenyl, propynyl, phenyl, chlorophenyl, methylphenyl, methoxyphenyl, phenoxymethyl, benzyl, cyclohexyl or 2-furyl.

It is very surprising that the amidophenylguanidines according to the invention possess a higher fungicidal activity, especially against powdery mildew fungi, than the above-mentioned known dodecylguanidine acetate. Also interesting is the fact that compounds according to the invention also exhibit a genuine systemic effectiveness against some important fungus-parasitary diseases. For example, it is possible, by applying the active compounds via the roots of the host plants, to protect cucumbers from powdery mildew of cucumber (*Erysiphe cichoracearum*), apples from apple scab (*Venturia inaequalis*) and powdery mildew of apple (*Podosphaeara leucotricha*) and broad beans (*Vicia faba*) from *Botrytis cinerea*. The prior art compounds mentioned have not evinced such a systemic activity. Because of their protective, curative and systemic fungicidal activity against a large number of phytopathogenic fungi and their low toxicity to warm-blooded animals, the compounds according to the invention represent a valuable enrichment of the art.

The invention also provides a process for the production of an amidophenylguanidine of the formula I in which a 2-aminoaniline derivative of the general formula

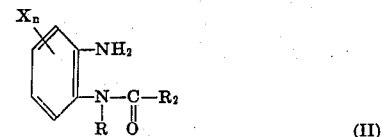

(II)

in which
X, n, R and $R_2$ have the meanings stated above, is reacted with an isothiourea of the general formula

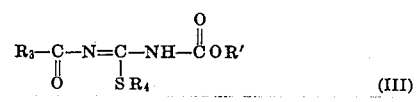

(III)

in which
$R_1$ and $R_3$ have the meanings stated above, and
$R_4$ is lower alkyl,
in the presence of a diluent and in the presence of 0.1 – 20 mole per cent of an inorganic or organic acid.

If 2-aminopropionanilide and N-carboethoxy-N'-propionyl-S-methylisothiourea are used as starting materials, the reaction course can be represented by the following formula scheme:

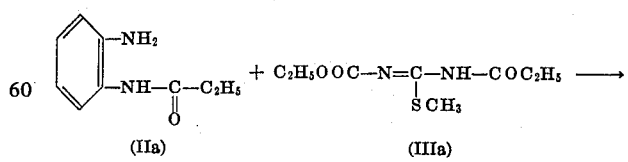

(IIa)         (IIIa)

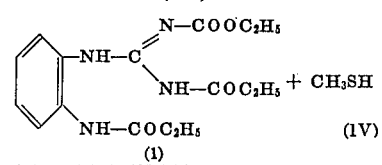

(IV)

The 2-aminoaniline derivatives used as starting materials are defined by the formula II.

As examples of these 2-aminoaniline derivatives, there may be mentioned 2-aminoacetanilide, 2-amino-4-methylacetanilide, 2-amino-butyranilide, 2-aminolauranilide, 2-aminostearanilide, benzoic acid (2-amino)-anilide, p-chlorobenzoic acid (2-amino)-anilide, phenoxyacetic acid (2-amino)-anilide, 2-furancarboxylic (2'-amino)-anilide, N-ethyl-N-acetyl-o-phenylenediamine, 2-amino-4-chloro-acetanilide, 2-amino-4-chloro-stearanilide, and the like.

The 2-amino-aniline derivates used as starting materials are largely known (cf. Beilsteins Handbuch der organischen Chemie, Volume 13, pages 20 – 32, Berlin 1930; Volume 13, 1 Erganzungswerk (1st Supplement), pages 8 – 10, Berlin 1933; Volume 13, 2 Erganzungswerk (2nd Supplement), pages 14 – 23, Berlin-Gottingen-Heidelberg 1950). They can also be obtained by reduction or catalytic hydrogenation of the corresponding nitro compounds.

The isothioureas used as starting materials and defined by the formula III are not yet known but they can readily be obtained analogously to known processes from known N-acylthioureas (see Berichte der deutschen chemischen Gesellschaft 6, 755 (1873); Ann. Chim. Phys. (5) 11, 313 (1877); J. American Chem. Soc. 62, 3274 (1940)), which may be reacted, in known manner, with alkylating agents (such as alkyl halides, alkyl sulfates and alkyl sulfonates) to give the corresponding S-alkyl-N-acyl-isothioureas (cf. J. Org. Chem. 30, 560, (1965); Chem. Pharm. Bull. (Tokyo), 9, 245 (1961)). These S-alkyl-N-acyl-isothioureas can then be reacted with haloformic acid esters or also with dialkyl pyrocarboxylates (cf. Berichte der deutschen chemischen Gesellschaft 71, 1797 (1938)) to give the S-alkyl-N-acyl-N'-alkoxycarbonyl-isothioureas. This last reaction corresponds to the principle of the known substitution of S-alkyl-isothioureas with chloroformic acid alkyl ester (cf. J. American Chem. Soc. 52, 3326 (1930)).

The diluent used in the process according to the invention is preferably a polar organic solvent. Preferred solvents include alcohols (such as methanol, ethanol or isopropanol) and their mixtures with water; ketones (such as acetone which may also be mixed with water); and ethers (such as dioxane or tetrahydrofuran).

The acids added as reaction-promoting catalysts when carrying out the process according to the invention may in principle be selected from any of the known organic or inorganic acids. Advantageously, however, the readily accessible, industrially important representatives of these classes are used. Examples include hydrochloric acid, sulfuric acid, nitric acid, formic acid, acetic acid and p-toluenesulfonic acid.

The reaction temperatures can be varied within a fairly wide range. In general, the reaction is carried out at about 50° to 120°C, preferably at about 60° to 100°C.

When carrying out the process according to the invention, one may generally use equimolar amounts of isothiourea of formula (III) and of 2-aminoaniline derivative of formula (II). Exceeding or going below the equimolar ratio by up to about 20 percent is possible without substantial diminution of yield.

The reaction is preferably carried out in a boiling solvent, alkylmercaptan being formed as by-product.

The end products are obtained in crystalline form when the reaction mixture is cooled and they can be separated by suction filtration and, if desired, can be purified by redissolving or recrystallization.

The active compounds according to the invention exhibit a strong fungitoxic activity. In the concentrations necessary for the control of fungi they do not normally harm cultivated plants and they have a low toxicity to warm-blooded animals. For these reasons they are suitable for use as crop protection agents for the control of fungi. Fungitoxic agents in crop protection are used for the control of *Archimycetes, Phycomycetes, Ascomycetes, Basidiomycetes* and *Fungi Imperfecti*.

The active compounds according to the invention have a very broad activity spectrum and can be applied against parasitary fungi which infect above-the-soil parts of plants or attack the plants from the soil, and against seed-borne and soil-borne fungal causative organisms of plant diseases.

In comparison with the prior art agents mentioned above, the compounds of the invention are more effective against those fungi which cause powdery mildew diseases. To this group of fungi there belong predominantly representatives from the family of the *Erysiphaceae* with the most important genera *Erysiphe, Uncinula (Oidium), Sphaerotheca* and *Podosphaera*. As important fungi, *Erysiphe cichoracearum, Podosphaera leucotricha* and *Uncinula necator* are particularly mentioned.

The active compounds of the invention also give good results in the control of rice diseases. Thus, they show an excellent activity against the fungi *Piricularia oryzae* and *Pellicularia sasakii*, by reason of which they can be used for the joint control of these two diseases. That means a substantial advance, since, up to now, agents of different chemical constitution have usually been required against these two fungi. Surprisingly, the active compounds show not only a protective activity but also a curative and systemic effect.

The compounds according to the invention also act against other fungi which infect rice plants or other cultivated plants, such as *Cochliobolus miyabeanus, Mycosphaerella musicola, Cercospora personata, Botrytis cinerea, Alternaria* species, *Verticillium alboatrum, Phialophora cinerescens* and *Fusarium* species, as well as against the bacterium *Xanthomonas oryzae*.

The active compounds according to the instant invention can be utilized, if desired, in the form of the usual formulations or compositions with conventional inert (i.e., plant compatible or herbicidally inert) pesticide diluents or extenders, i.e., diluents, carriers or extenders of the type usable in conventional pesticide formulations or compositions, e.g., conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g., conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g., benzene, toluene, xylene, alkyl naphthalenes, etc.), halogenated, especially chlorinated, aromatic hydrocarbons (e.g., chlorobenzenes, etc.), cycloalkanes (e.g., cyclohexane, etc.), paraffins (e.g., petroleum or mineral oil fractions), chlorinated aliphatic hydrocarbons (e.g., methylene chloride, chloroethylenes, etc.), alcohols (e.g., methanol, ethanol, propanol, butanol, glycol, etc.) as well as ethers and esters thereof (e.g., glycol monomethyl ether, etc.), amines (e.g., ethanolamine, etc.), amides (e.g., dimethyl formamide, etc.), sulfoxides (e.g., dimethyl sulfoxide, etc.), acetonitrile, ketones (e.g., acetone, methyl ethyl ketone, methyl isobutyl ketone, cyclohexanone, etc.), and/or water; as well as inert dispersible finely divided solid carriers, such as ground natural minerals (e.g., kaolins, clays, alumina, silica, chalk, i.e., calcium carbonate, talc, attapulgite, montmorillonite, kieselguhr, etc.) and ground synthetic minerals (e.g., highly dispersed silicic acid, silicates, e.g., alkali silicates, etc.); whereas the following may be chiefly considered for use as conventional carrier vehicle assistants, e.g., surface-active agents, for this purpose: emulsifying agents, such as non-ionic and/or anionic emulsifying agents (e.g., polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or insecticides, acaricides, rodenticides, bactericides, nematocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 2–90 percent by weight, of the mixture, whereas carrier composition mixtures suitable for direct application or field application generally contemplate those in which the active compound is present in an amount substantially between about 0.0001–10 percent, preferably 0.01–1 percent, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g., a surface-active agent, such as an emulsifying agent and/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e., by applying such compound if normally a liquid, or by applying a liquid composition containing the same, via very effective atomizing equipment, in finely divided form, e.g., average particle diameter of from 50–100 microns, or even less, i.e., mist form, for example by airplane crop spraying techniques. Only up to at most about a few liters/hectare are needed, and often amounts only up to about 15 to 1,000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g., about 20–100 percent by weight of the active compound.

In the case of use as seed dressing, applied amounts of 0.1 to 10 g of active compound per kg of seed are generally suitable, preferably 0.2 to 2 g.

In the case of use as soil treatment agent, applied amounts of 1 to 500 g per cubic meter of soil are generally suitable, preferably 10 to 200 g.

The active compounds according to the invention also show a systemic insecticidal activity as well as some fungi-static activity in the case of saprophytic micro-organisms.

Furthermore, the present invention contemplates methods of selectively killing, combating or controlling pests, e.g., fungi, which comprises applying to at least one of such fungi and the corresponding habitat thereof, i.e., the locus to be protected, a correspondingly combative or toxic amount, i.e., a fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

| | |
|---|---|
| *Piricularia* test: | liquid preparation of active compound |
| Solvent: | 1.9 parts by weight dimethyl formamide |
| Dispersing agent: | 0.1 part by weight alkylarylpolyglycol ether |
| Water: | 98 parts by weight |

The amount of active compound required for the desired concentration in the spray liquor is mixed with the stated amount of solvent, and the concentrate is diluted with the stated amount of water containing the stated dispersing agent.

30 rice plants about 14 days old are sprayed with the spray liquor until dripping wet. The plants remain in a greenhouse at temperatures of 22° to 24°C and a relative atmospheric humidity of about 70 percent until they are dry. They are then inoculated with an aqueous suspension of 100,000 to 200,000 spores/ml of *Piricu-*

*laria oryzae* and placed in a chamber at 24°–26°C and 100 percent relative atmospheric humidity.

5 days after inoculation, the infection of all the leaves present at the time of inoculation is determined as a percentage of the untreated but also inoculated control plants. 0 percent means no infection; 100 percent means that the infection is exactly as great in the case of the control plants.

The active compounds, the concentrations of the active compounds and the results can be seen from the following Table 1:

TABLE 1

Piricularia test/liquid preparation of active compound

| Active compound | Infection as a percentage of the infection of the untreated control with a concentration of active compound (in percent) of 0.05 |
|---|---|
| 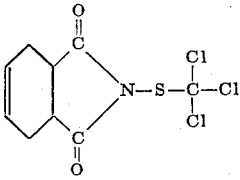 (known) "Captan" (B). | 75 |
| 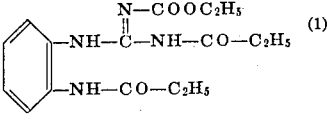 (1) | 25 |
| 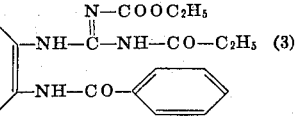 (2) | 50 |

EXAMPLE 2

Bacteria test: *Xanthomonas oryzae*

| Solvent: | 1.9 parts by weight dimethyl formamide |
| Dispersing agent: | 0.1 part by weight alkylarylpolyglycol ether |
| Water: | 98 parts by weight |

The amount of active compound necessary for the desired concentration of active compound in the spray liquor is mixed with the stated amount of the solvent and of the dispersing agent, and the concentrate is diluted with the stated amount of water.

30 rice plants about 30 days old are sprayed with the spray liquor until dripping wet. The plants remain in a greenhouse at temperatures of 22° to 24°C and a relative atmospheric humidity of about 70 percent until they are dry. Needles are then dipped into an aqueous bacterial suspension of *Xanthomonas oryzae* and the plants are inoculated by pricking the leaves. After inoculation, the plants stand in a chamber of 26° to 28°C and 80 percent relative atmospheric humidity.

10 days after inoculation, the infection in the case of all the leaves injured by pricking, inoculated and previously treated with the preparation is determined as a percentage of the untreated but likewise inoculated leaves of the control plants. 0 percent denotes no infection; 100 percent means that the infection is exactly as great as in the case of the control plants.

The active compounds, the concentrations of active compound and the results can be seen from the following Table:

TABLE 2

Bacteria test *Xanthomonae oryzae*

| Active compound | Infection as a percentage of the untreated control with a concentration of active compound (in percent) of 0.05 |
|---|---|
| 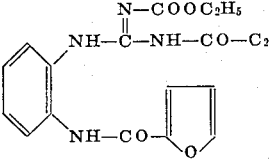 (3) | 50 |

EXAMPLE 3

Mycelium growth test

Nutrient medium used:
| 20 parts by weight agar-agar | 5 parts by weight peptone |
| 200 parts by weight potato decoction | 2 parts by weight $Na_2HPO_4$ |
| 5 parts by weight malt | 0.3 parts by weight $Ca(NO_3)_2$ |
| 15 parts by weight dextrose | |

Proportion of solvent mixture to nutrient medium:
2 parts by weight solvent mixture
100 parts by weight agar nutrient medium
Composition solvent mixture:
0.19 parts by DMF
0.01 parts by weight emulsifier Emulvin W
1.80 parts by weight water
2.00 parts by weight solvent mixture The amount of active compound required for the desired concentration of active compound in the nutrient medium is mixed with the stated amount of solvent mixture. The concentrate is thoroughly mixed in the stated proportion with the liquid nutrient medium which has been cooled to 42°C and is then poured into Petri dishes of 9 cm diameter. Control dishes to which the preparation has not been added are also set up.

When the nutrient medium has cooled and solidified, the dishes are inoculated with the species of fungi stated in the Table and incubated at about 21°C.

Evaluation is carried out after 4–10 days, dependent upon the speed of growth of the fungi. When evaluation is carried out the radial growth of the mycelium on the treated nutrient media is compared with the growth on the control nutrient media. In the evaluation of the fungus growth, the following characteristic values are used:

0 no fungus growth
1 very strong inhibition of growth
2 medium inhibition of growth
3 slight inhibition of growth
4 growth equal to that of untreated control.

The active compounds, their concentrations and the results obtained can be seen from Table 3:

TABLE 3
Mycelium growth test

| Active compounds | Concentration of active compound, p.p.m. | Fungi | | | | | |
|---|---|---|---|---|---|---|---|
| | | Piricularia oryzae | Phialophora cinerescens | Mycosphaerella musicola | Verticillium alboatrum | Fusarium dianthi | Colletotrichum coffeanum |
| CH₂—NH—CS—S \\ Zn / CH₂—NH—CS—S  (known) "Zineb" (C). | 10 | 0 | 4 | 1 | 4 | 4 | 4 |
| ⟨phenyl⟩—NH—C(=N—COOC₂H₅)—NH—CO—C₂H₅ (1), —NH—CO—C₂H₅ | 10 | 0 | 0 | 0 | 1 | 1 | 0 |
| ⟨phenyl⟩—NH—C(=N—COOC₂H₅)—NH—CO—C₂H₅ (2), —NH—CO—furyl | 10 | 1 | 0 | 0 | 0 | 1 | 0 |

EXAMPLE 4

*Botrytis test/systemic*

| | | |
|---|---|---|
| Solvent: | 4.7 | parts by weight acetone |
| Dispersing agent: | 0.3 | parts by weight alkylarylpolyglycol ether |
| Water: | 95 | parts by weight |

The amount of active compound required for the desired concentration of the active compound in the liquid to be used for watering was mixed with the stated amount of solvent, and the concentrate was diluted with the stated amount of water which contained the stated conditions.

Plants of *Vicia faba* grown in standard soil were, in the 1-2 leaf stage, watered three times in one week with 20 cc of the liquid to be used for watering, in the stated concentration of active compound, with reference to 100 cc of soil.

After the treatment, the lower two leaf-pairs were removed and, in each case, placed in a Petri dish lined with moist filter paper. Small discs of filter paper of 1 cm diameter were then dipped into an aqueous conidium suspension of the grey mold causative organism *Botrytis cinerea* Pers. ex Fr. and laid on the leaves. After an incubation period of 48 hours in the closed dishes at 20°C, the necroses visible under the small discs were evaluated according to frequency of occurrence (evaluation scheme O–V). The evaluation values obtained were converted into percentage infection.

0 percent means no infection; 100 percent means that the infection was exactly as great as in the case of the control plants.

The active compounds, the concentrations of the active compounds and the results can be seen from the following Table 4.

TABLE 4
Botrytis test/systemic

| Active compound | Infection as a percentage of the infection of the untreated control with a concentration of active compound of 120 p.p.m. |
|---|---|
| C₁₂H₂₅NH—C(=NH)(NH₂) · CH₃COOH (known) (A). | 100 |
| ⟨phenyl⟩—NH—C(=N—COOC₂H₅)—NH—CO—C₂H₅ (1), —NH—CO—C₂H₅ | 18 |
| ⟨phenyl⟩—NH—C(=N—COOC₂H₅)—NH—CO—C₂H₅ (2), —NH—CO—furyl | 12 |
| ⟨phenyl⟩—NH—C(=N—COOC₂H₅)—NH—CO—C₂H₅ (5), —NH—CO—CH₂—O—⟨phenyl⟩ | 47 |
| ⟨phenyl⟩—NH—C(=N—COOC₂H₅)—NH—CO—C₂H₅ (6), —NH—CO—C₃H₇-n | 45 |
| ⟨phenyl⟩—NH—C(=N—COO—CH₃)—NH—CO—C₂H₅ (7), —NH—CO—C₂H₅ | 50 |

TABLE 4 — Continued
Botrytis test/systemic

| Active compound | Infection as a percentage of the infection of the untreated control with a concentration of active compound of 120 p.p.m. |
|---|---|
| 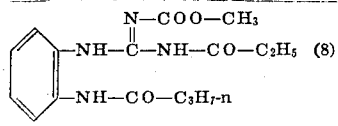 (8) | 50 |
| 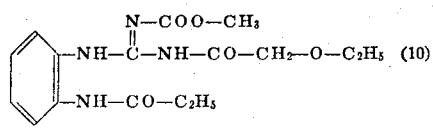 (10) | 50 |
| 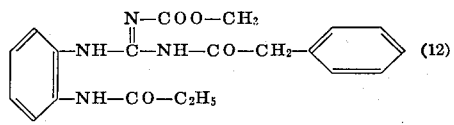 (12) | 50 |

EXAMPLE 5

*Erysiphe* test/systemic
Solvent: 4.7 parts by weight acetone
Dispersing agent: 0.3 parts by weight alkylaryl polyglycol ether
Water: 95 parts by weight The amount of the active compound required for the desired concentration in the liquid to be used for watering is mixed with the stated amount of the solvent, and the concentrate is diluted with the stated amount of water containing the stated additions.

Cucumber plants grown in standard soil are, in the one- to two-leaf stage, watered in one week with 20 cc of the liquid to be used for watering, in the stated concentration of active compound with reference to 100 cc of soil.

The plants so treated are, after the treatment, inoculated with conidia of the fungus *Erysiphe cichoracearum*. The plants are subsequently placed in a greenhouse at 23°–24°C and a relative atmospheric humidity of 70 percent.

After 12 days, the infection of the cucumber plants is determined as a percentage of the untreated but also inoculated control plants. 0 percent means no infection; 100 percent means that the infection is exactly as great as in the case of the control plants.

The active compounds, the concentrations of the active compounds and the results obtained can be seen from the following Table 5:

TABLE 5
Erysiphe test/systemic

| Active compound | Infection as a percentage of the infection of the untreated control with a concentration of active compound of 120 p.p.m. |
|---|---|
| $C_{12}H_{25}NH-C\begin{smallmatrix}NH\\\\NH_2\end{smallmatrix}\cdot CH_3COOH$ (known) (A). | 100 |

TABLE 5 — Continued
Erysiphe test/systemic

| Active compound | Infection as a percentage of the infection of the untreated control with a concentration of active compound of 120 p.p.m. |
|---|---|
| 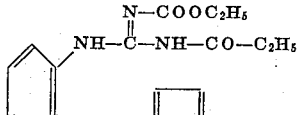 (2) | 0 |
| 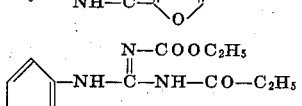 (5) | 47 |
| 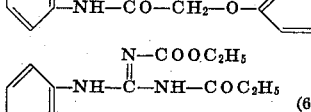 (6) | 17 |
| 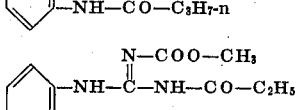 (7) | 27 |
| 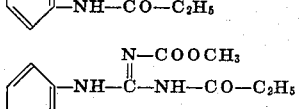 (8) | 23 |
| 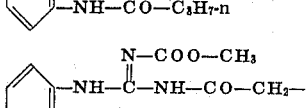 (10) | 20 |
| 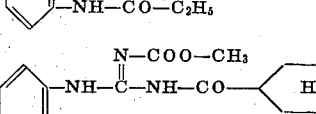 (11) | 63 |
| 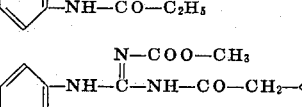 (12) | 47 |

EXAMPLE 6

*Fusicladium* test (systemic)
Solvent: 4.7 parts by weight acetone
Emulsifier: 0.3 parts by weight alkylaryl polyglycol ether
Water: 95 parts by weight The amount of the active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3–4 leaf stage, watered once in one week with 20 cc of the liquid to be used for watering, in the stated concentration of active compound, with reference to 100 cc of soil. The plants so treated are, after the treatment, inoculated with an aqueous conidium suspension of *Fusicladium dendriticum Fuckel* and incubated for 18 hours in a humidity chamber at 18°–20°C and at a relative atmospheric humidity of 100 percent. The plants are subsequently placed in a greenhouse for 14 days.

15 days after inoculation, the infection of the seedlings is determined as a percentage of the untreated but also inoculated control plants. 0 percent means no infection; 100 percent means that the infection is exactly as great as in the case of the control plants.

The active compounds, the concentrations of the active compounds and the results obtained can be seen from the following Table 6:

TABLE 6
Fusicladium test/systemic

| Active compound | Infection as a percentage of the infection of the untreated control with a concentration of active compound of 15 p.p.m. |
| --- | --- |
| $C_{12}H_{25}NH-C(=NH)(NH_2) \cdot CH_3COOH$ (A) (known) | 100 |
| (1) phenyl—NH—C(=N—COOC$_2$H$_5$)—NH—CO—C$_2$H$_5$; —NH—CO—C$_2$H$_5$ | 16 |
| (2) phenyl—NH—C(=N—COOC$_2$H$_5$)—NH—CO—C$_2$H$_5$; —NH—CO—(furyl) | 0 |
| (5) phenyl—NH—C(=N—COOC$_2$H$_5$)—NH—CO—C$_2$H$_5$; —NH—CO—CH$_2$—O—phenyl | 77 |
| (6) phenyl—NH—C(=N—COOC$_2$H$_5$)—NH—COC$_2$H$_5$; —NH—CO—C$_3$H$_7$-n | 14 |
| (7) phenyl—NH—C(=N—COO—CH$_3$)—NH—CO—C$_2$H$_5$; —NH—CO—C$_2$H$_5$ | 0 |
| (8) phenyl—NH—C(=N—COO—CH$_3$)—NH—CO—C$_2$H$_5$; —NH—CO—C$_3$H$_7$-n | 2 |
| (9) phenyl—NH—C(=N—COO—CH$_3$)—NH—CO—C$_2$H$_5$; —NH—CO—phenyl | 77 |
| (10) phenyl—NH—C(=N—COO—CH$_3$)—NH—CO—CH$_2$—O—C$_2$H$_5$; —NH—CO—C$_2$H$_5$ | 75 |

EXAMPLE 7

*Podosphaera* test (systemic)

| | |
| --- | --- |
| Solvent: | 4.7 parts by weight acetone |
| Dispersing agent: | 0.3 parts by weight alkylaryl polyglycol ether |
| Water: | 95 parts by weight |

The amount of active compound required for the desired concentration of the active compound in the liquid to be used for watering is mixed with the stated amount of solvent, and the concentrate is diluted with the stated amount of water which contains the stated additions.

Apple seedlings grown in standard soil are, in the 3 – 4 leaf stage, watered in one week with 20cc of the liquid to be used for watering, in the stated concentration of active compound, with reference to 100 cc of soil. The plants so treated are, after the treatment, inoculated with conidia of *Podosphaera leucotricha* Salm and placed in a greenhouse at a temperature of 21° – 23°C and at a relative atmospheric humidity of about 70 percent. 10 days after the inoculation, the infection of the seedlings is determined as a percentage of the untreated but also inoculated control plants.

0 percent means no infection; 100 percent means that the infection is exactly as great as in the case of the control plants.

The active compounds, the concentrations of the active compounds and the results obtained can be seen from the following Table 7:

TABLE 7
Podosphaera test/systemic

| | Infection as a percentage of the infection of the untreated control with a concentration of active compound of— | |
| --- | --- | --- |
| Active compound | 120 p.p.m. | 30 p.p.m. |
| $C_{12}H_{25}NH-C(=NH)(NH_2) \cdot CH_3COOH$ (A) (known) | 100 | —— |
| (1) phenyl—NH—C(=N—COOC$_2$H$_5$)—NH—CO—C$_2$H$_5$; —NH—CO—C$_2$H$_5$ | —— | 13 |

The following further examples are set forth to illustrate, without limitation, the process for producing the active compounds according to the present invention.

EXAMPLE 8 a. 870 g (theory = 852 g = 6 moles) of methyl iodide were added at boiling heat to 792 g of N-propionylthiourea (6 moles) in 3 liters of acetone. Thereafter, further boiling was effected for 2 hours. Cooling to 0°C was subsequently effected and the mixture was left to stand over night. The precipitate was filtered off with suction, washed with ether and dried. There were obtained 1,300 g (83.5 percent of theory) of N-propionyl-S-methylisothiourea hydroiodide; melting point 119° to 120°C.

b. 548 g (2 moles) of N-propionyl-S-methylisothiourea hydroiodide were introduced into 2 liters of ethanol. To this were added 202 g (2 moles) of triethylamine; thereafter, there were added to the clear solution 405 g (2.5 moles) of diethyl pyrocarboxylate, with stirring. The temperature rose to about 35°C; then the end product began to separate. After 3 hours' stirring at room temperature, suction filtration was effected. There were obtained 358 g (82 percent of theory) of N-carboethoxy -N'-propionyl-S-methylisothiourea after drying. M.p. 92°–94°C. As further compounds of formula (III) which can be prepared in similar manner, there may be mentioned:

N-carbomethoxy-N'-propionyl-S-methyl-isothiourea, m.p. 97°–99°C;
N-carbomethoxy-N'-ethoxyacetyl-S-methyl-isothiourea, m.p. 69°–70°C;
N-carbomethoxy-N'-cyclohexylcarbonyl-S-methyl-isothiourea, m.p. 67°–68°C;
N-carbomethoxy-N'-phenylacetyl-S-methyl-isothiourea, m.p. 55°–56°C;
N-carboethoxy-N'-benzoyl-S-methyl-isothiourea, m.p. 79°–80°C.

c) 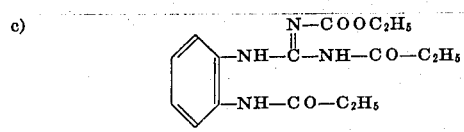
(1)

32.8 g (0.2 mole) of 2-aminopropionanilide, 40 g (0.18 mole) of N-carboethoxy-N'-propionyl-S-methylisothiourea and 2.6 g (0.015 mole) of p-toluenesulfonic acid in 150 ml of ethanol were heated to the boil for 3 hours. The reaction solution was filtered hot. After cooling, suction filtration from the precipitate was effected. There were obtained 45 g (74 percent of theory) of N-carboethoxy -N'-propionyl-N''-2-propionamidophenylguanidine of the melting point 132°–133°C.

In analogous manner, the following compounds were prepared:

| Compound number | Structural formula | Melting point (°C.) |
|---|---|---|
| 2 | [structure] | 123–124 |
| 3 | [structure] | 144–146 |
| 4 | [structure] | 159–160 |
| 5 | [structure] | 118–120 |
| 6 | [structure] | 124–125 |
| 7 | [structure] | 127–128 |
| 8 | [structure] | 118–129 |
| 9 | [structure] | 151–152 |
| 10 | [structure] | 143–144 |
| 11 | [structure] | 153–154 |
| 12 | [structure] | 140–141 |
| 13 | [structure] | 151–152 |

It will be appreciated that the instant specification and examples are set forth by way of illustration and not limitation, and that various modifications and changes may be made without departing from the spirit and scope of the present invention.

What is claimed is:

1. An amidophenylguanidine of the formula

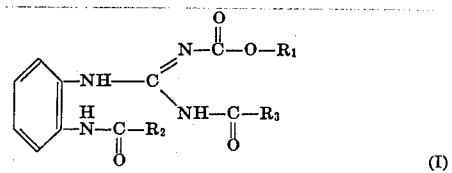
(I)

in which
R₁ is alkyl of 1–6 carbon atoms,
R₂ is lower alkyl of 1–6 carbon atoms optionally substituted by phenoxy; cycloalkyl of 5–8 carbon atoms; benzyl; phenyl; or furyl; and R₃ is lower alkyl optionally substituted by lower alkoxy; cycloalkyl of 5-8 carbon atoms, benzyl; phenyl; or furyl.

2. A compound according to claim 1 in which R₁ is methyl, ethyl, propyl or butyl, R₂ is methyl, ethyl, propyl, cyclohexyl, phenyl, phenoxymethyl or 2-furyl, and R₃ is methyl, ethyl, propyl, ethoxymethyl, phenyl, benzyl, cyclohexyl or 2-furyl.

3. A compound according to claim 2 in which R₂ is methyl, ethyl, propyl, cyclohexyl, phenyl or 2-furyl, and R₃ is methyl, ethyl, propyl, benzyl, cyclohexyl or 2-furyl.

4. The compound according to claim 1, wherein such compound is

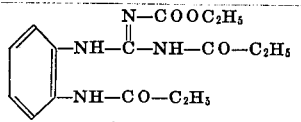

(1)

5. The compound according to claim 1 wherein such compound is

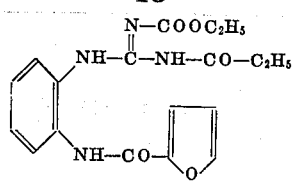

(2)

6. The compound according to claim 1, wherein such compound is

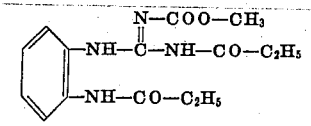

(7)

7. the compound according to claim 1, wherein such compound is

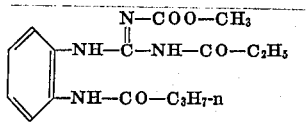

(8)

* * * * *